United States Patent [19]

Evans

[11] Patent Number: 4,851,113
[45] Date of Patent: Jul. 25, 1989

[54] FILTER APPARATUS FOR SLURRY

[75] Inventor: Stephen Evans, Bath, England

[73] Assignee: Delfilt Limited, Avon, England

[21] Appl. No.: 98,460

[22] Filed: Sep. 18, 1987

Related U.S. Application Data

[63] Continuation of Ser. No. 829,016, Feb. 13, 1986, abandoned.

[30] Foreign Application Priority Data

Feb. 19, 1985 [GB] United Kingdom ............... 8504177

[51] Int. Cl.$^4$ .................. B01D 29/02; B01D 33/04; B01D 37/04
[52] U.S. Cl. .................. 210/141; 210/143; 210/400; 210/406
[58] Field of Search ............ 210/91, 141, 143, 145, 210/147, 400, 401, 406, 138; 364/502; 162/256

[56] References Cited

U.S. PATENT DOCUMENTS

| | | | |
|---|---|---|---|
| 2,445,416 | 7/1948 | Baker et al. | 162/256 |
| 2,895,614 | 7/1959 | Komline | 210/141 |
| 3,310,172 | 3/1967 | Beduhn | 210/143 |
| 3,506,128 | 4/1970 | Pashaian et al. | 210/400 |
| 4,233,157 | 11/1980 | Miller | 210/143 |

FOREIGN PATENT DOCUMENTS

| | | | |
|---|---|---|---|
| 2803287 | 8/1979 | Fed. Rep. of Germany . | |
| 846855 | 8/1960 | United Kingdom . | |
| 1149444 | 4/1969 | United Kingdom . | |
| 1184119 | 3/1970 | United Kingdom . | |
| 1434211 | 5/1976 | United Kingdom . | |
| 2052290 | 1/1980 | United Kingdom | 210/401 |
| 2028155 | 3/1980 | United Kingdom . | |
| 2090764 | 7/1982 | United Kingdom . | |
| 2119669 | 11/1983 | United Kingdom | 210/400 |

Primary Examiner—Richard V. Fisher
Assistant Examiner—Linda Evans
Attorney, Agent, or Firm—Larson and Taylor

[57] ABSTRACT

A filter has an endless filter cloth, which passes under a slurry feed and over a suction box, through which suction is applied to the cloth to remove liquid from the slurry. The cloth is driven by a roller, around which the cloth is trained, linked to a motor. The operation of the motor is controlled by a central device so that the cloth is advanced incrementally, the length of advance of an increment being predetermined and selected to satisfy operating requirements. The control device can also provide for regular acceleration and deceleration.

8 Claims, 4 Drawing Sheets

FILTER APPARATUS FOR SLURRY

This application is a continuation of application Ser. No. 829,016 filed Feb. 13, 1986 (not abandoned).

FIELD OF THE INVENTION

This invention relates to filtering equipment, and more particularly to the filtering of liquid-based slurries.

BACKGROUND OF THE INVENTION

Conventional filtration equipment for this purpose commonly takes the form of an endless filter cloth which is transported over one or more suction boxes, whereby slurry applied to the upper surface of the filter cloth is "dewatered" by the action of the vacuum in the suction box drawing the liquid through the cloth, leaving the filter cake to be carried onward by the cloth to a suitable discharge point. To move the filter cloth while suction is taking place is usually difficult or can result in an unacceptably high rate of wear of the cloth, and accordingly the cloth is normally moved intermittently, with suction taking place while the cloth is stationary. The intermittent movement of the cloth may be achieved by reciprocating part of the support for the filter cloth, for example one of the rollers around which the cloth is trained, while arranging for the movement of the cloth to be unidirectional, so that the reciprocating movement of the cloth-supporting member advances the cloth during its movement in one direction, while the unidirectional mechanism prevents reverse movement of the cloth when the cloth-supporting member is moved in the other direction. The reciprocating movement is commonly achieved by means of a hydraulic or neumatic ram, and the cloth is advanced by a fixed increment on each stroke of the ram. Examples of such a mechanism can be seen from GB 1434211, GB 2052290, GB 2090764 and GB 2119669. Such a method for intermittently advancing the filter cloth is mechanically simple, but is limited in its range of operating options, since the length of the incremental advance is fixed by the stroke of the ram, and the speed of advance is difficult to control, either overall or during the course of each advancing stroke.

Another problem which arises with conventional designs of filter apparatus is that of slippage of the filter cloth, particularly when operating with a heavy filter cake. In other words, the cloth may not be advanced to its correct incremental extent. Also, in another type of equipment which uses reciprocating suction boxes, a heavy filter cake can result in the cloth tending to move with the suction boxes.

A further problem, in part associated with the foregoing constructions, is that of cracking of the filter cake as a result of the intermittent movement of the filter cloth, since the cloth cannot be totally inextensible. If cracks are formed in the filter cake, then when the cake is washed, the wash liquid will preferentially flow through the cracks rather than through the cake, resulting in inefficient washing. Likewise drying of the cake by drawing air through it will be inefficient if there are cracks.

SUMMARY OF THE INVENTION

The present invention provides improvements in the design of filtering equipment, as will be apparent from the following description of one embodiment.

DETAILED DESCRIPTION OF THE PREFERRED EMBODIMENTS

Figure 1:
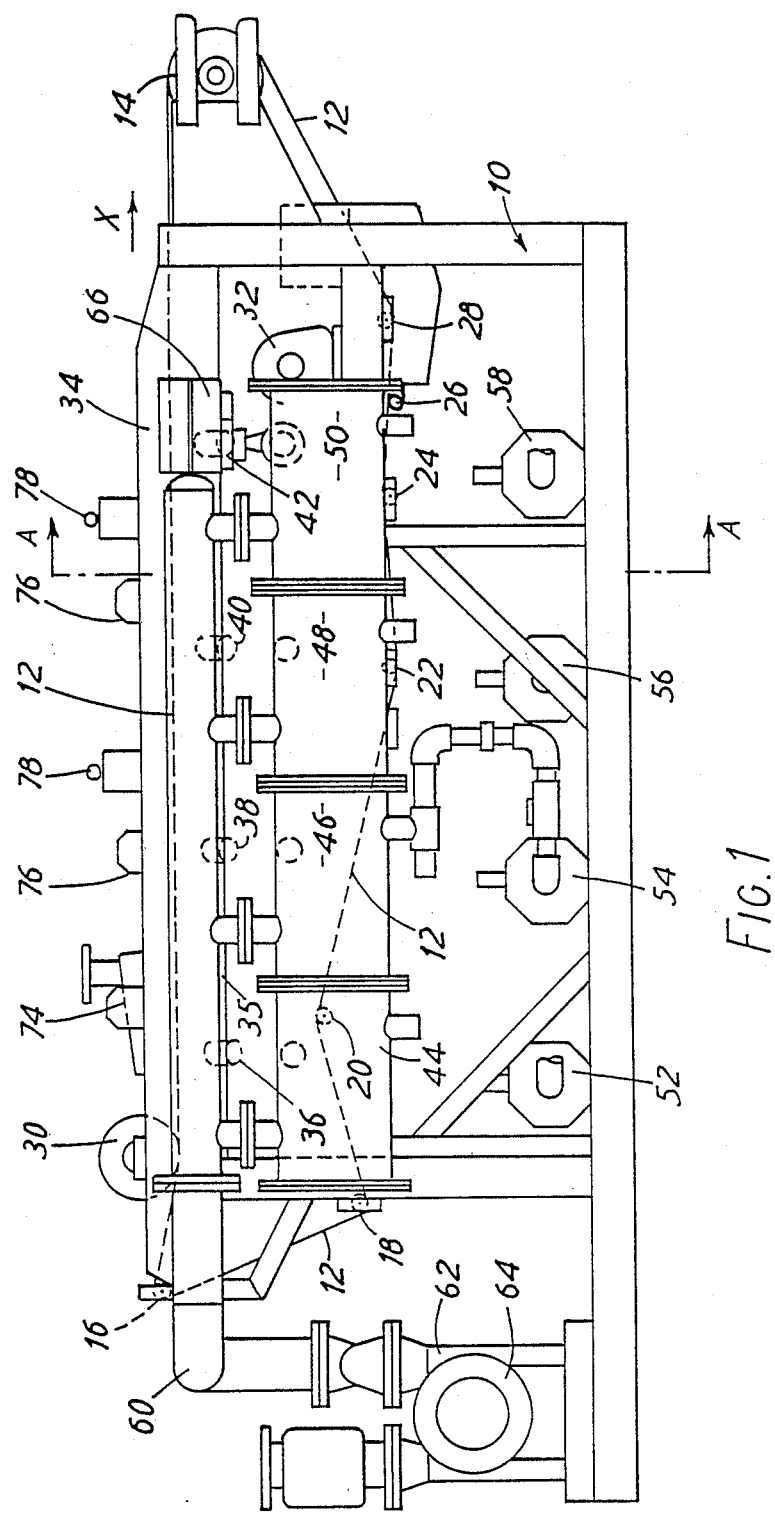
FIG. 1 shows a side view of the filter apparatus.
Figure 2:
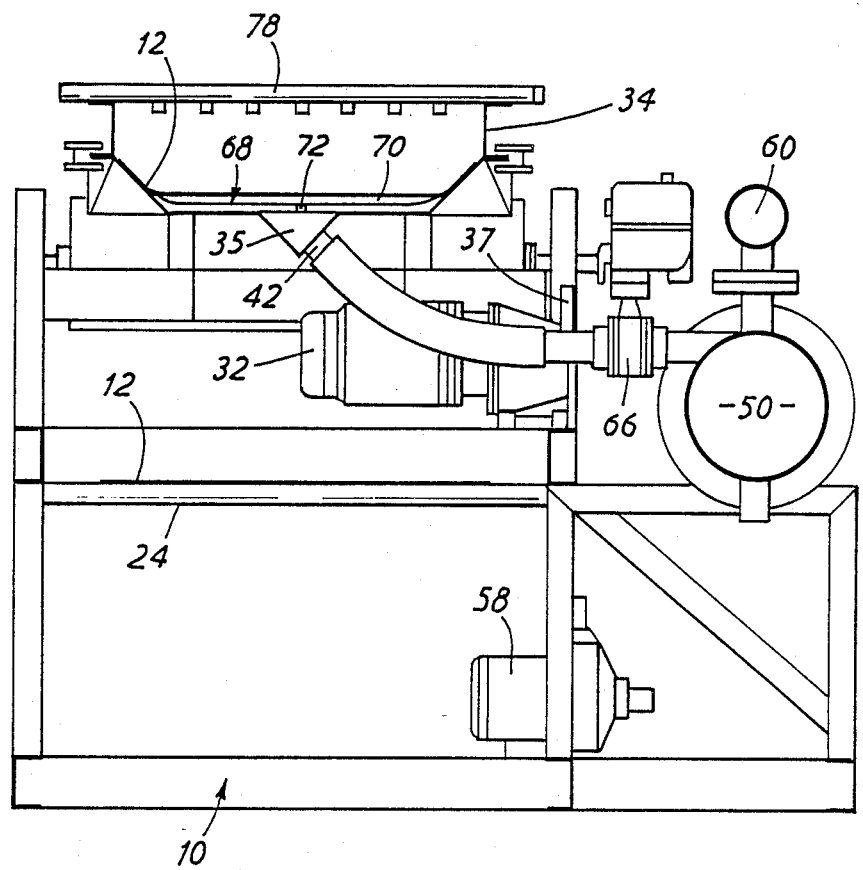
FIG. 2 shows a cross-section on the line A—A of FIG. 1.

Referring to the drawings, and firstly to FIGS. 1 and 2, the filter equipment comprises a frame 10 on which an endless filter cloth 12 is carried and guided by a variety of rollers journalled to the frame. These rollers comprise a driven end return roller 14 at one end of the frame, and a free running end return roller 16 at the other end of the frame, with free running guide rollers 18,20,22,24,26,28 along the lower (return) run of the filter cloth. Of these the roller 20 is a tracking roller to provide lateral control, and the roller 22 is a gravity tensioning roller. In addition, a dam roller 30 bears down upon the top surface of the filter cloth on the top (filtering) run of the cloth, at the beginning of the run; the cloth being driven in the direction indicated by the arrow X by means of a motor 32 connected to the roller 14. (Instead of driving the roller 14, the motor may be arranged to drive a roller at some other point in the cloth circuit. On larger machines, for example, it may be necessary to have the drive roller at the rear of the filter on the return run to ensure movement of the filter cloth.) Along its upper run the filter cloth lies in a filter trough 34 which has a compartmented suction box 35, the compartments having respective filtrate outlets 36, 38,40,42 leading to respective filtrate receiving containers 44,46,48,50, which in turn are drained, for example by means of respective filtrate pumps 52,54,56,58 (for the sake of clarity, only one connection between filtrate pump and filtrate container is shown in FIG. 1, namely between container 46 and pump 54. However, the connection is the same in relation to the other containers also). Alternatively or additionally the drainage could be by gravity. Vacuum is applied to the filter containers 44 to 50 by means of a common vacuum manifold 60 operated by a vacuum pump 62 driven by a motor 64. Alternatively different levels of vacuum in various compartments could be provided by separate vacuum pumps connected to different containers or groups of containers. The connected between the filtrate outlets 36 to 42 and their respective filtrate containers 44 to 50 is made via respective motorized shut-off valves 66 (for clarity, only one such is shown in FIG. 1). In the base of the trough 34 above the suction box 35 is located a vacuum tray assembly 68, whose top surface is formed with a series of transverse channels 70 to apply vacuum to the undersurface of the filter cloth 12, and receive filtrate therefrom, each channel having a central drain opening 72 leading to one of the filtrate outlets 36 to 42. Over the top of the filter run are provided various conventional devices, such as a slurry feed assembly 74, flap dam assemblies 76 and cake wash distribution assemblies 78.

The number of compartments in the suction box, and the number of filtrate receiving containers and pumps can be varied as required by the particular filtering application, even so far as having only a single compartment, container and pump.

Various other items of equipment are also connected to the apparatus, but for clarity are not shown in FIGS. 1 and 2. However, the principal such component and their function will become apparent from the following description in relation to the remaining drawings.

Figure 3:
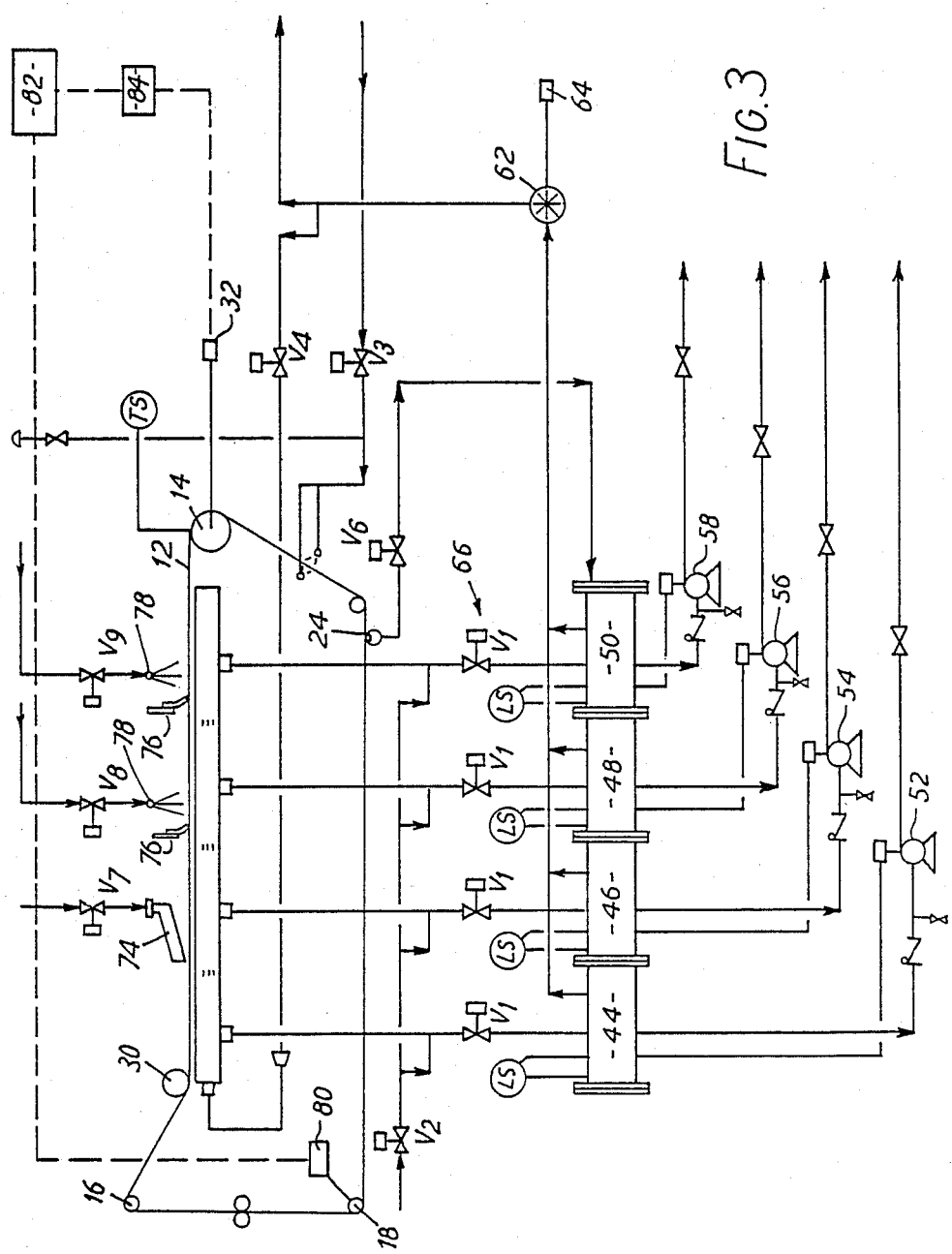
FIG. 3 is a diagrammatic representation of the working of the filter equipment.

With reference to FIG. 3, this shows the working of the apparatus of FIGS. 1 and 2, but would vary according to the particular apparatus or filter application under consideration. Movement of the filter cloth is detected by means of a device for measuring the rotation of one of the idler rollers for the filter cloth. Such a device 80 is shown connected to the roller 18, but it could be connected to any of the other idler rollers (in FIG. 3 not all the rollers shown in FIG. 1 are represented). The rotation can be measured by any suitable means, but one suitable device is an optical incremental shaft encoder (Logicon Systems Limited W-Series type W9D43 10/1), which provides a digital pulse electrical output, which is fed to a programmable controller 82 (Mitsubishi F-20PE).

The motor 32 is an electric induction motor with integral gearbox (Allspeeds Limited MAS Series 35/D) driving the roller 14 through a pulley belt (not shown). The motor speed is controlled by an inverter 84 (Allspeeds Limited Toshiba Tosvert-130G-4030) in response to signals from the controller 82. The controller also controls the operation of the various valves $V_1$ to $V_9$ shown in FIG. 3, and also referred to in FIG. 4.

The four valves $V_1$ shown in FIG. 3 correspond to the valves 66 controlling the applications of vacuum from the filtrate containers 44 and 50 to the outlets 36 to 42 respectively from the suction box 35.

In addition, there is a valve $V_2$ linked to the vacuum box (by junctions 37 in the conduits connecting the vacuum box to the valves 66—see FIG. 2). Operation of this valve releases the vacuum in the suction box, but, being upstream of the valves 66 and operable only when the valves 66 are closed, vacuum is maintained in the filtrate containers 44 to 50.

Valve $V_3$ is optionally provided in a line supplying liquid for washing the filter cloth in the return run.

Valve $V_4$ is provided in an optional air line which supplies air to pressurise the suction box and provide a lift to the filter cloth over the vacuum tray, thereby facilitating its forward travel.

Optional valve $V_6$ is in a line connecting a cloth drying roller 24 to filtrate container 50, so as to draw off liquid from the filter cloth during its return run.

Valve $V_7$ lies in the supply line to the slurry feed 74, while valves $V_8$ and $V_9$ lie in the supply lines to the product wash distributors 78.

Further items of the equipment include a tracking sensor TS which checks the correct tracking of the cloth, and level sensors LS which control the withdrawal of liquid in the containers 44 to 50, for example by switching on pumps 52 to 58, which the liquid level rises to a predetermined level.

The controller 82 can be programmed in a number of different ways, according to the intended operation of the filter equipment, but one such program is illustrated with reference to FIG. 4. Inspection of this program will show that it provides three alternative modes of operation, designated A, B and C respectively. The procedure for operating the equipment is:
1. Start vacuum pump.
2. Select process A, B or C.
3. Start the filter.

Figure 4:
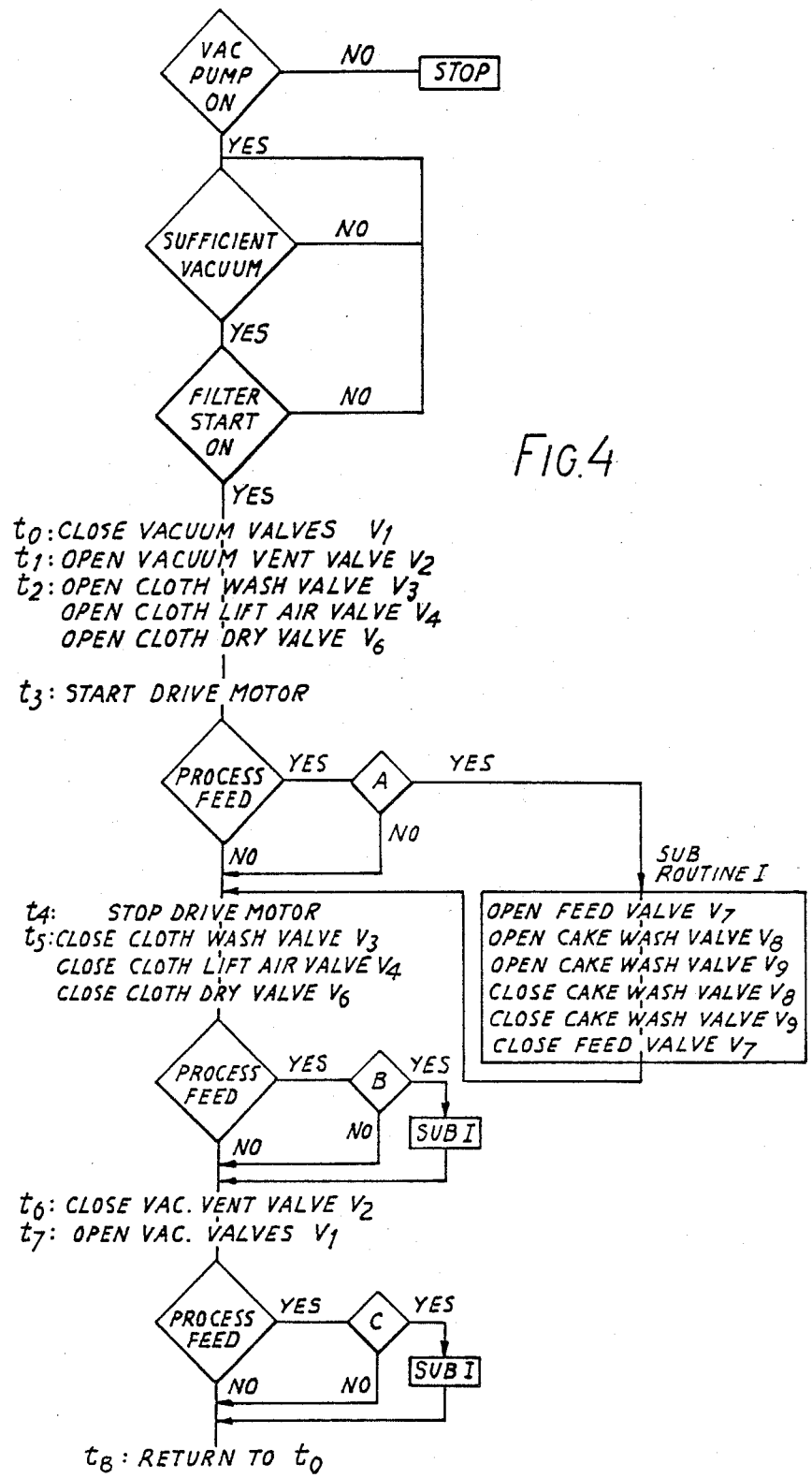
FIG. 4 is a logic diagram of an operational program for the equipment.

Item 3 initiates the programmed controller according to the diagram shown in FIG. 4.

First of all, the controller goes through steps $t_0$ to $t_3$, which are common to all three modes of operation. This involves closing the valves $V_1$ (66) so that vacuum is cut off from the vacuum box; opening vacuum vent valve $V_2$ so that the vacuum box can rise to atmospheric pressure; opening the cloth wash valve $V_3$ so that washing liquid is applied to the return run of the cloth during the cloth advance which is about to take place; opening cloth lift air valve $V_4$, pressurizing the vacuum box and giving a lift to the filter cloth; opening the cloth drying valve $V_6$ (if provided); and then starting the drive motor 32. This initiates advance of the filter cloth, which is measured by the encoder device 80, so that the controller can shut off the motor when the cloth has moved forward a predetermined increment.

In the meantime, the controller goes through one of the process routines A, B or C.

If process A has been selected, then the controller goes through sub-routine 1 which involves opening the feed valve $V_7$ to supply slurry to the filter cloth, opening the cake wash valves $V_8$ and $V_9$ and subsequently closing the cake wash valves and feed valve after a predetermined period (during the forward advance of the filter cloth). The controller then stops the drive motor at point $t_4$ in the program when the encoder 80 indicates that the cloth has moved forward the predetermined incremental distance. Then, at point $t_5$ in the program, the controller closes the cloth wash valve $V_3$, the cloth lift valve $V_4$ and the cloth drying valve $V_6$ (if provided). Then, (program B not having been selected) the programmer moves on to points $t_6$ and $t_7$ in the program, at which the vent valve $V_2$ is closed and the vacuum valves $V_1$ (66) are opened. This results in vacuum being applied to the material on the filter cloth, the cloth itself of course being stationary at this time. After a predetermined time, the programmer moves (routine C not having been selected) to point $t_8$ on the program, which returns the program to $t_0$, so that the sequence can begin again.

Thus, in routine A, the slurry and wash liquid are fed to the filter cloth while it is moving forward, but before any vacuum is applied to the cloth.

If, instead, routine B is selected, the controller ignores routine A, and between points $t_3$ and $t_4$ it merely moves the cloth forward the predetermined incremental distance. It then goes through sub-routine I between points $t_5$ and $t_6$, so that the slurry and cake was liquid are supplied to the filter cloth while the cloth is stationary but before any vacuum is applied to it.

If, instead, routine C has been selected, the programmer ignores routines A and B, and goes through subroutine I between points $t_7$ and $t_8$ in the program; so that slurry and cake wash liquid are applied to the filter cloth when the cloth is stationary and vacuum is being applied to the cloth.

A feature of the inverter 84 is that it has a programmable ramp facility, which provides a controlled and predetermined increase and decrease in the output to the motor when switching on and switching off respectively. Thus, the motor is provided with controlled acceleration and dceleration, which can be selected to provide a regular (smooth or orderly) acceleration and deceleration to the filter cloth so as to minimize shock applied to the filter cloth, and hence to the filter cake, and thereby reduce the risk of cracking of the filter cake.

Another feature of the equipment is that the extent of incremental advance of the filter cloth can be varied as desired simply by programming the controller 82 accordingly. The stationary period can even be eliminated altogether, so that the cloth runs continuously, which may be practicable in certain applications where only a very light slurry is being filtered. In the normal incremental advance, however, the ability to vary the increment at will makes the equipment extremely versatile, so that it can be used in a wide variety of applications. In addition, by determining the incremental advance by measuring the rotation of an idler roller in contact with the cloth, the forward movement of the cloth can be accurately determined. In contrast, if the incremental movement is determined by a fixed time increment, or by measurement of the rotation of the driving system for the filter cloth, the distance moved by the cloth is much less accurately known, because of the possible slippage between the cloth and the drive roller 14.

I claim:

1. Filter apparatus, comprising:
   a frame;
   an endless filter cloth mounted on the frame;
   a means for feeding slurry onto the cloth;
   a suction box under the cloth;
   means for incrementally advancing the filter cloth under the slurry feed and over the suction box; and
   means for applying suction while the cloth is stationary between incremental advances;
   wherein the incremental advancing means comprises:
   a single drive roller around which the filter cloth is trained;
   a single drive motor arranged to drive the drive roller; and
   control means for starting the drive to the filter cloth and stopping it after the predetermined length of advance of the cloth, said control means including means for providing regularly controlled acceleration of said filter cloth when said control means starts said drive to said filter cloth and for providing regularly controlled deceleration of said filter cloth when said control means stops said drive to said filter cloth.

2. Filter apparatus according to claim 1 comprising means for detecting the incremental advance of the filter cloth, said incremental advance detecting means comprising a non-driven roller around which the cloth is trained and means for detecting the rotation of said non-driven roller so that the incremental advance of the cloth is determined according to said rotation.

3. Filter apparatus according to claim 1, wherein said means for providing controlled acceleration and deceleration has an acceleration ramp.

4. A filter apparatus according to claim 1, having means for drying said filter cloth prior to the feeding of slurry onto the filter cloth by said feeding means.

5. Filter apparatus comprising:
   a frame;
   an endless filter cloth mounted on the frame;
   a means for feeding slurry onto the cloth;
   a suction box under the cloth;
   means for incrementally advancing the filter cloth under the slurry fed and over the suction box; and
   means for applying suction to the cloth to remove liquid from the slurry;
   wherein the advancing means comprises:
   a single drive roller around which the filter cloth is trained;
   a single drive motor arranged to drive the drive roller, said motor having means for providing regularly controlled acceleration and deceleration of the filter cloth; and
   control means for starting the drive to the filter cloth and stopping it after a predetermined length of advance of the cloth, said control means including a means for providing regularly controlled acceleration of said filter cloth when said control means starts said drive to said filter cloth and for providing regularly controlled deceleration when said control means stops the drive to the filter cloth.

6. Filter apparatus according to claim 5, wherein said means for providing controlled acceleration and deceleration has an acceleration ramp.

7. Filter apparatus comprising:
   a frame;
   an endless filter cloth mounted on the frame;
   a means for feeding slurry onto the cloth;
   a suction box under the cloth;
   means for incrementally advancing the filter cloth under the slurry feed and over the suction box;
   means for detecting the incremental advance of the filter cloth; and
   means for applying suction to the cloth to remove liquid from the slurry;
   wherein the incremental advancing means comprises:
   a single drive roller around which the filter cloth is trained;
   a single drive motor arranged to drive the drive roller; and
   control means for starting the drive to the filter cloth and stopping it after a predetermined length of advance of the cloth, said control means including means for providing regularly controlled acceleration of said filter cloth when said control means starts said drive to said filter cloth and for providing regularly controlled deceleration of said filter cloth when said control means stops said drive to said filter cloth;
   and wherein the means for detecting the incremental advance of the filter cloth comprises a non-driven roller around which the cloth is trained, and means for detecting the rotation of said non-driven roller so that the incremental advance of the cloth is determined according to said rotation.

8. Filter apparatus, comprising:
   a frame;
   an endless filter cloth mounted on the frame;
   a means for feeding slurry onto the cloth;
   a suction box under the cloth;
   means for incrementally advancing the filter cloth under the slurry feed and over the suction box; and
   means for applying suction while the cloth is stationary between incremental advances;
   wherein the incremental advancing means comprises:
   a single drive roller around which the filter cloth is trained;
   a single drive motor arranged to drive the drive roller; and
   control means for starting the drive to the filter cloth and stopping it after the predetermined length of advance of the cloth, said control means including means for providing regularly controlled acceleration of said filter cloth when said control means starts said drive to said filter cloth and for providing regularly controlled deceleration of said filter cloth when said control means stops said drive to said filter cloth, and said control means also including means for varying said predetermined length of advance.

* * * * *